United States Patent
Cromer et al.

(10) Patent No.: US 6,480,972 B1
(45) Date of Patent: Nov. 12, 2002

(54) DATA PROCESSING SYSTEM AND METHOD FOR PERMITTING A SERVER TO REMOTELY PERFORM DIAGNOSTICS ON A MALFUNCTIONING CLIENT COMPUTER SYSTEM

(75) Inventors: Daryl Carvis Cromer, Cary, NC (US); Brandon Jon Ellison, Raleigh, NC (US); Eric Richard Kern, Durham, NC (US); Howard Locker, Cary, NC (US); Randall Scott Springfield, Chapel Hill, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/257,547

(22) Filed: Feb. 24, 1999

(51) Int. Cl.[7] .............................................. G06K 11/00
(52) U.S. Cl. ......................................... 714/25; 714/27
(58) Field of Search ............................. 714/25, 27, 30, 714/31

(56) References Cited

U.S. PATENT DOCUMENTS

| | | | | |
|---|---|---|---|---|
| 6,170,021 B1 | * | 1/2001 | Graf | 709/219 |
| 6,175,927 B1 | * | 1/2001 | Cromer et al. | 707/1 |
| 6,175,934 B1 | * | 1/2001 | Hershey et al. | 700/177 |
| 6,314,476 B1 | * | 11/2001 | Ohara | 709/202 |
| 6,314,530 B1 | * | 11/2001 | Mann | 714/25 |
| 6,324,644 B1 | * | 11/2001 | Rakavy et al. | 713/1 |
| 6,332,202 B1 | * | 12/2001 | Sheikh et al. | 714/25 |

* cited by examiner

Primary Examiner—Robert Beausoleil
Assistant Examiner—Bryce P. Bonzo
(74) Attorney, Agent, or Firm—Bracewell & Patterson, LLP; Carlos Munoz-Bustamante

(57) ABSTRACT

A data processing system and method are described for permitting a server computer system to perform remote diagnostics on a malfunctioning client computer system coupled to the server computer system utilizing a network. The server computer system transmits a diagnostic command to the malfunctioning client computer system utilizing the network. A network adapter operating as a bus controller for an internal bus within the malfunctioning client computer system executes the diagnostic command. The network adapter transmits a result of the execution of the diagnostic command to the server computer system. In this manner, the diagnostic command is executed within a malfunctioning client computer system by a remote, server computer system.

19 Claims, 7 Drawing Sheets

DATA PROCESSING SYSTEM AND METHOD FOR PERMITTING A SERVER TO REMOTELY PERFORM DIAGNOSTICS ON A MALFUNCTIONING CLIENT COMPUTER SYSTEM

BACKGROUND OF THE INVENTION

1. Field of the Invention

The present invention relates in general to data processing systems and, in particular, to a data processing system and method including a server and client computer systems coupled together utilizing a network. Still more particularly, the present invention relates to a data processing system and method including a server and client computer systems coupled together utilizing a network for permitting the server to perform diagnostics remotely on a malfunctioning client computer system.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

With PCs being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources. In today's networked world, the availability and performance of the network is as important as the availability and performance of the personal computer.

Diagnostics programs are essential to system administrators in determining the source of hardware problems. In known systems, diagnostics programs are software application programs that run on the client computer system. A server may transfer a diagnostics program over the network to a client to be executed on the client. However, in order to permit the server to transfer the program code to the client via the network, the client must be fully functional. Once the program has been transferred to the client, the server may cause the diagnostics program to begin executing on the client utilizing a DMI command. However, again, the client must be fully functional in order to receive this command.

Valuable data may be obtained by the diagnostics program regarding a malfunctioning client. For example, the client computer system may be hung or malfunctioning to a point where the diagnostic program cannot run. In either of these cases, in order to execute the diagnostic program, the client must be restarted. By restarting the client, however, the condition which caused the malfunction may also be removed, thus losing the valuable data.

Therefore a need exists for a data processing system and method for permitting a server computer system to perform remote diagnostics on a malfunctioning client computer system.

SUMMARY OF THE INVENTION

A data processing system and method are described for permitting a server computer system to perform remote diagnostics on a malfunctioning client computer system coupled to the server computer system utilizing a network. The server computer system transmits a diagnostic command to the malfunctioning client computer system utilizing the network. A network adapter operating as a bus controller for an internal bus within the malfunctioning client computer system executes the diagnostic command. The network adapter transmits a result of the execution of the diagnostic command to the server computer system. In this manner, the diagnostic command is executed within a malfunctioning client computer system by a remote, server computer system.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

Figure 5A:
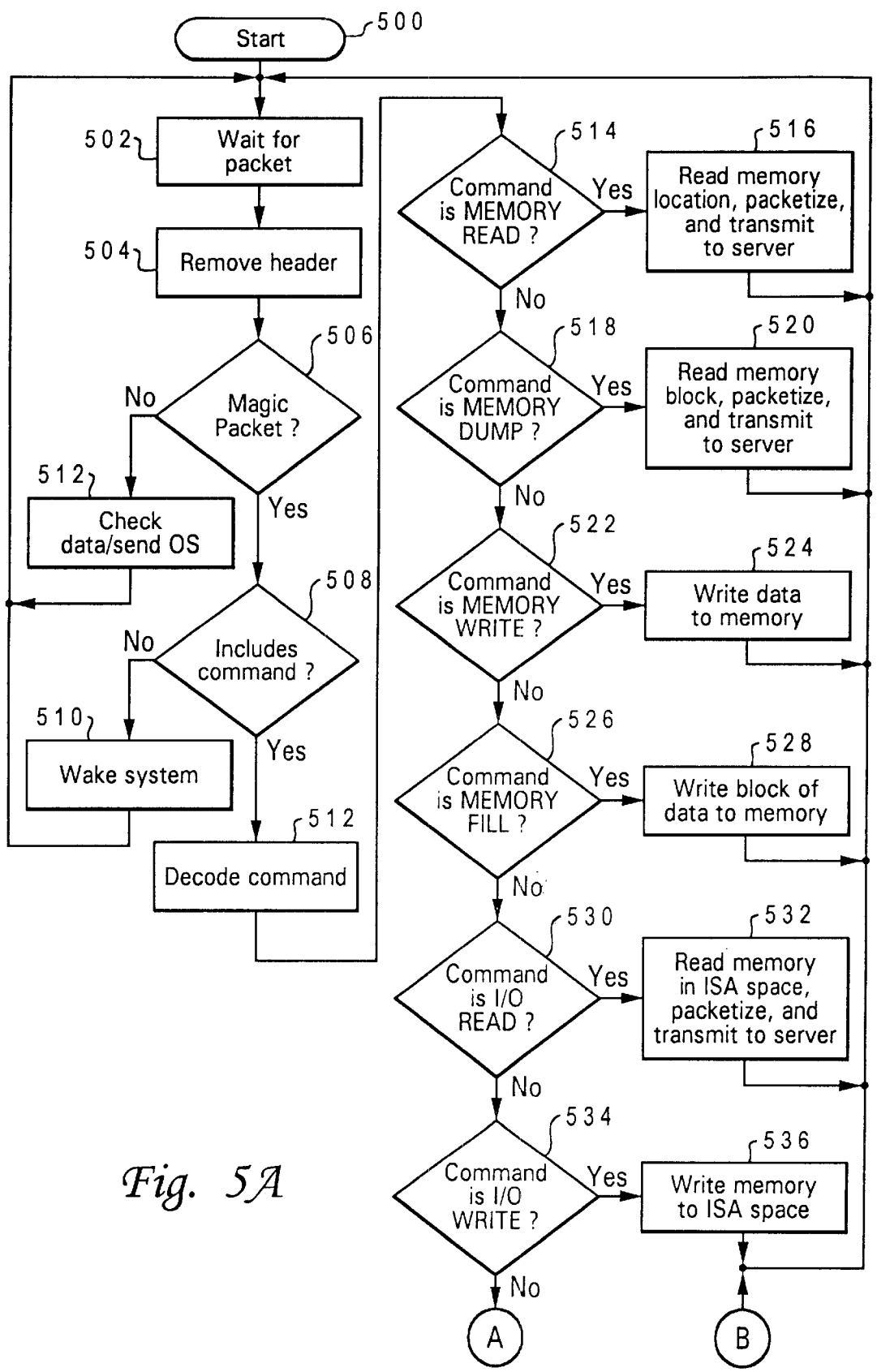
FIGS. 5A and 5B together depict a high level flow chart which illustrates a client computer system receiving a diagnostic command from a server computer system in accordance with the method and system of the present invention.
Figure 5B:
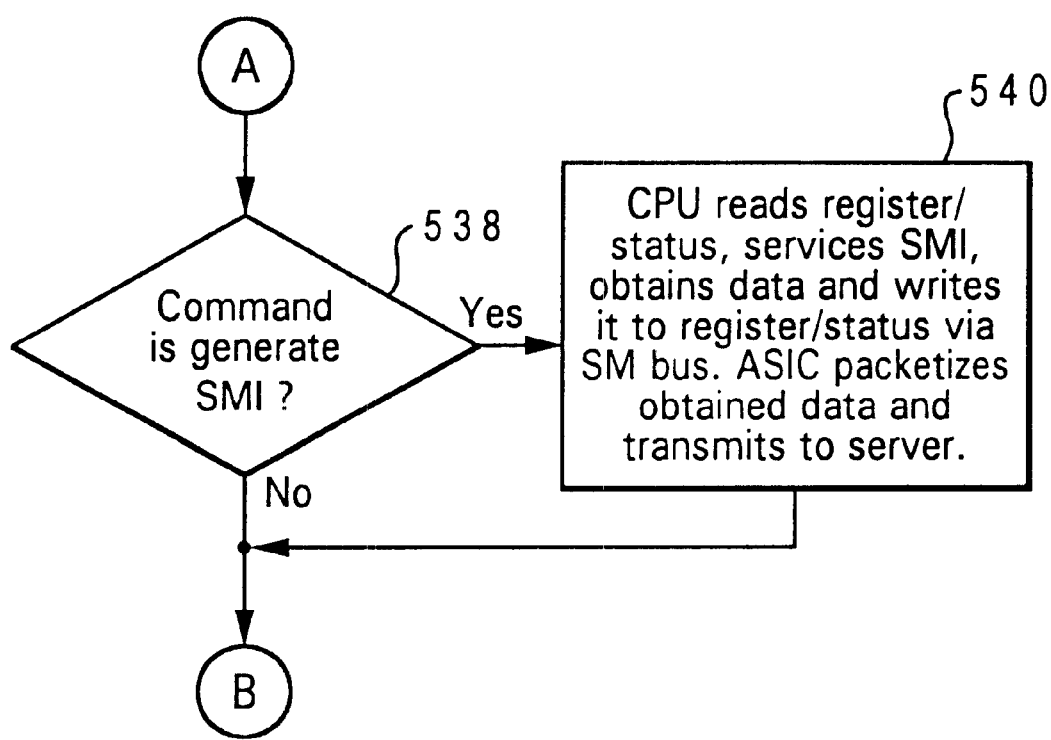

A preferred embodiment of the present invention and its advantages are better understood by referring to FIGS. 15B 5B of the drawings, like numerals being used for like and corresponding parts of the accompanying drawings.

The present invention is a method and system for permitting a server computer system to perform remote diagnostics on a malfunctioning client computer system which is coupled to the server utilizing a network. The client includes a network adapter operating as a bus controller for an internal bus within the client. The network adapter executes the diagnostic command, and transmits a result of the execution to the server.

The network adapter is utilized by the server computer system to gain access to a client computer system in order to cause the client to execute diagnostic commands. The server may gain access to a fully functioning, malfunctioning, or non-functioning client. The adapter is capable of acting as a bus controller which may generate any type of permitted bus transaction. The adapter may also generate a system management interrupt in order to cause the client's central processing unit (CPU) to execute any type of special purpose code.

Figure 1:
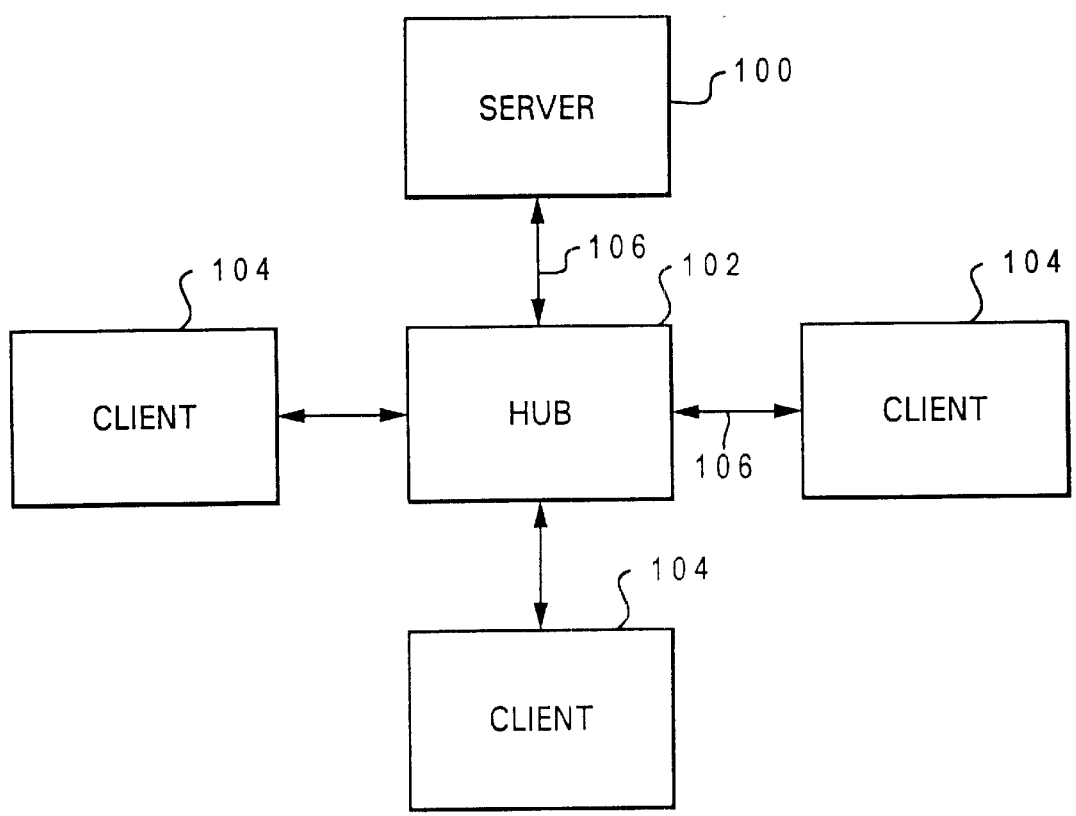
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

Figure 2:
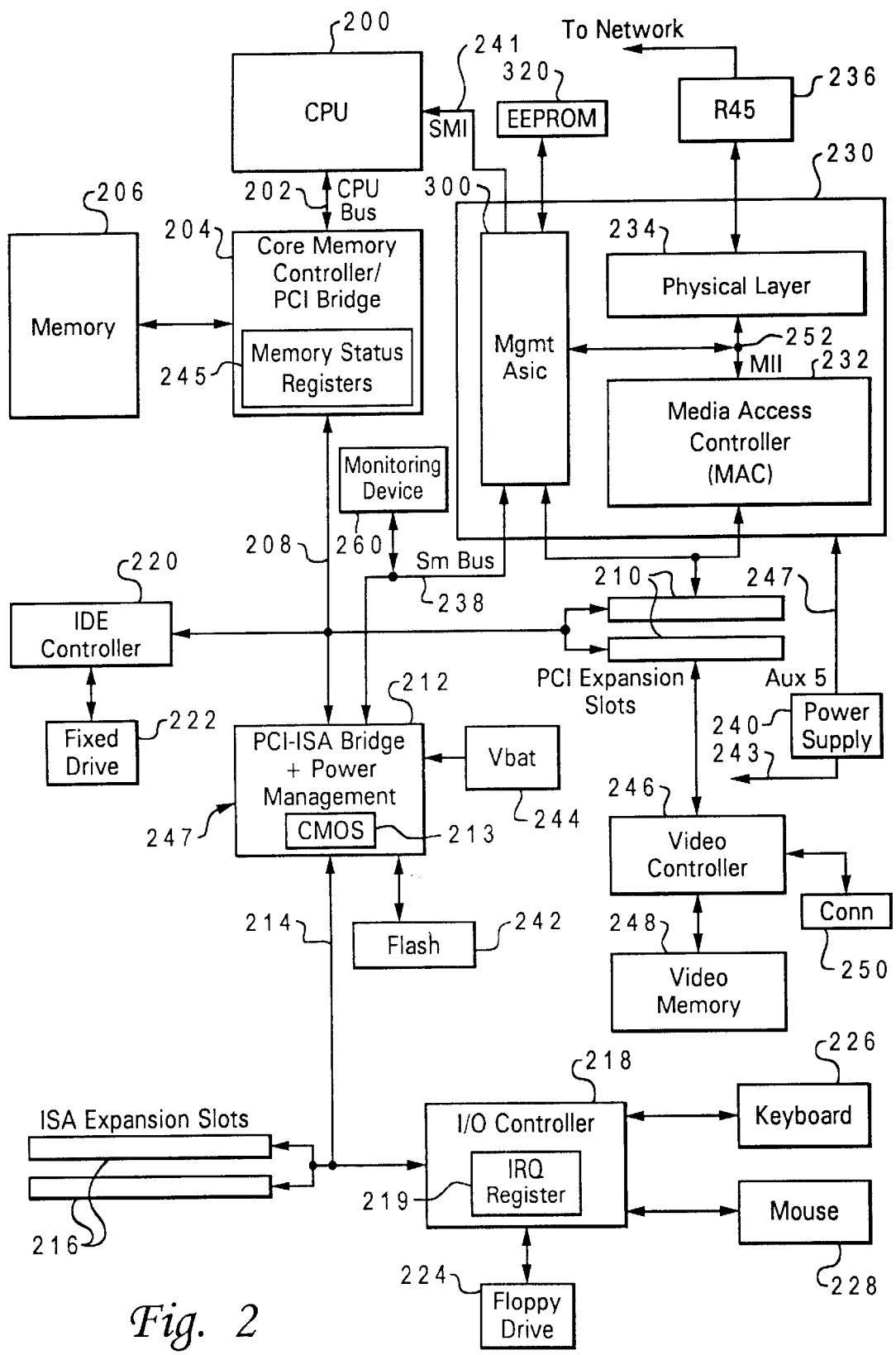
FIG. 2 depicts a pictorial representation of a network adapter included within a client computer system in accordance with the method and system of the present invention.

FIG. 2 illustrates a pictorial representation of a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is also coupled to system memory 206. Memory controller 204 includes memory status registers 245. Memory status registers 245 are utilized to maintain a single bit error counter, multiple bit error address, and an address of a single bit error. Memory status registers 245 are accessible utilizing CPU bus 202. Devices residing on PCI 208 may not typically access registers 245.

An integrated drive electronics (IDE) device controller 220 and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200 I/O controller 218 also includes an IRQ register 219 for enabling/disabling of IRQ's, determining active IRQ's, and clearing IRQs.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power 243, and has an auxiliary power main AUX 5 247 which supplies full time auxiliary power 247 to the power management logic 212 and to the network adapter 230. This enables client 104 to respond to a wakeup signal from network adapter 230. In response to a receipt of the wakeup signal, normal system power 243 from power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

Known network adapters may act as PCI bus masters capable of generating a limited type of bus transactions, or bus cycles. For example, known network adapters typically may transfer data to and from memory utilizing the PCI bus to which they are coupled, but may not generate any other type of bus transaction.

The network adapter of the present invention, network adapter 230, acts as a bus controller, capable of generating any type of permitted bus transaction. Network adapter 230 may generate data transfers to memory locations, such as memory 206 through controller/bridge 204, flash 242 through bridge 212, and/or video memory 248 through video controller 246. Network adapter 230 may generate data transfers to input/output locations fixed disk 222 through IDE controller 220, video controller 246, and slots 216, I/O controller 218, and floppy driver 224 through bridge 212. Network adapter 230 may, utilizing a system management interrupt, access memory status registers 245, CMOS 213, and/or IRQ register 219, or cause CPU 200 to execute special purpose code.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a special purpose processing unit 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

ASIC 300 is also coupled to CPU 200 utilizing system management interrupt (SMI) line 241. A system management interrupt is a low level interrupt which is received by CPU 200 When an SMI is received by CPU 200, CPU 200 changes its execution stream in order to service the SMI. The code that CPU 200 processes in response to a receipt of an SMI could be any type of code desired by a programmer. For example, special purpose code could be written to transfer the content of one of memory status registers 245, CMOS 213, or IRQ register 219 to ASIC 300. ASIC 300 then could transfer this data to server 100. In this manner, ASIC 300 may transmit system management interrupts to CPU 200 for processing which could retrieve information which is not normally accessible to a network adapter.

Data from client computer system 104 is accessed by ASIC 300 over a system management bus (SM) 238. System management bus 238 is a two-wire low speed serial bus used to connect system management devices. This provides a path to allow software running on client 104 to access ASIC 300. With the trickle power supplied by signal AUX 5 247 from power supply 240, ASIC 300 is preferably powered full time.

A monitoring device 260 is included which monitors and stores voltage, temperature, and status of a fan (not shown). Monitoring device 260 may be implemented utilizing a model LM81 device available from National Semiconductor, Santa Clara, Calif. ASIC 300 may send a command to monitoring device 260 utilizing SM bus 238 to retrieve monitoring information.

Figure 3:
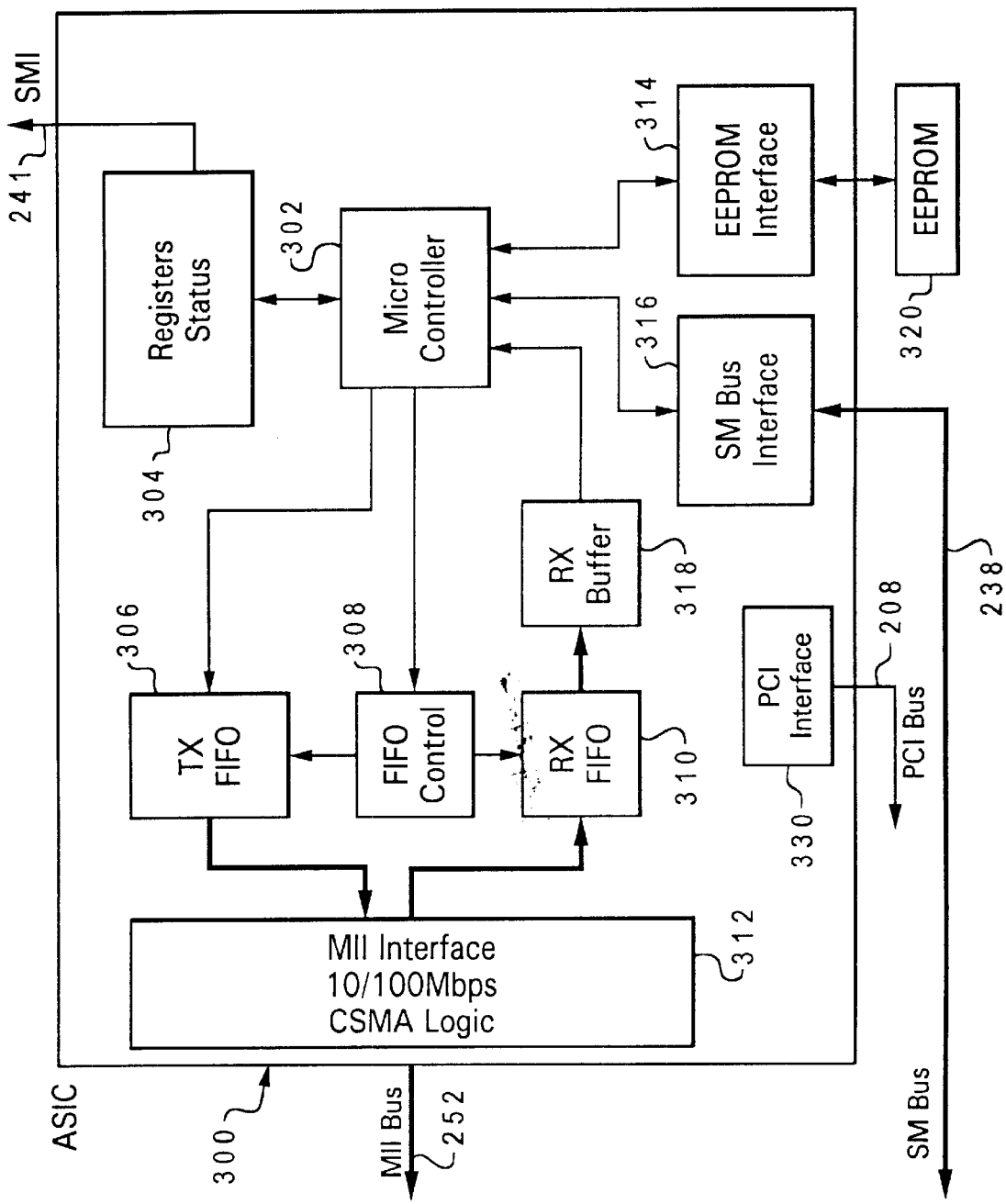
FIG. 3 illustrates a pictorial representation of a special purpose processing unit included within a network adapter included within a client computer system in accordance with the method and system of the present invention.

FIG. 3 illustrates a pictorial representation of a special purpose processing unit included within network adapter 230 included within a client computer system 104 in accordance with the method and system of the present invention. Special purpose processing unit is implemented utilizing ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests through SM bus interface 316 from software running on client 104 to access register status 304. Register status 304 is capable of generating SMI 241. Micro-controller 302 is capable of acting as an SM bus master. Signals are received from the MII bus 252 by interface unit 312 and passed to RX FIFO 310. ASIC 300 includes an EEPROM interface 314 for coupling ASIC 300 to a storage device such as EEPROM 320.

ASIC 300 includes a PCI bus interface 330 which enables ASIC 300 to access PCI bus 208. In this manner, ASIC 300 may generate PCI bus transactions, or cycles.

Figure 4A:
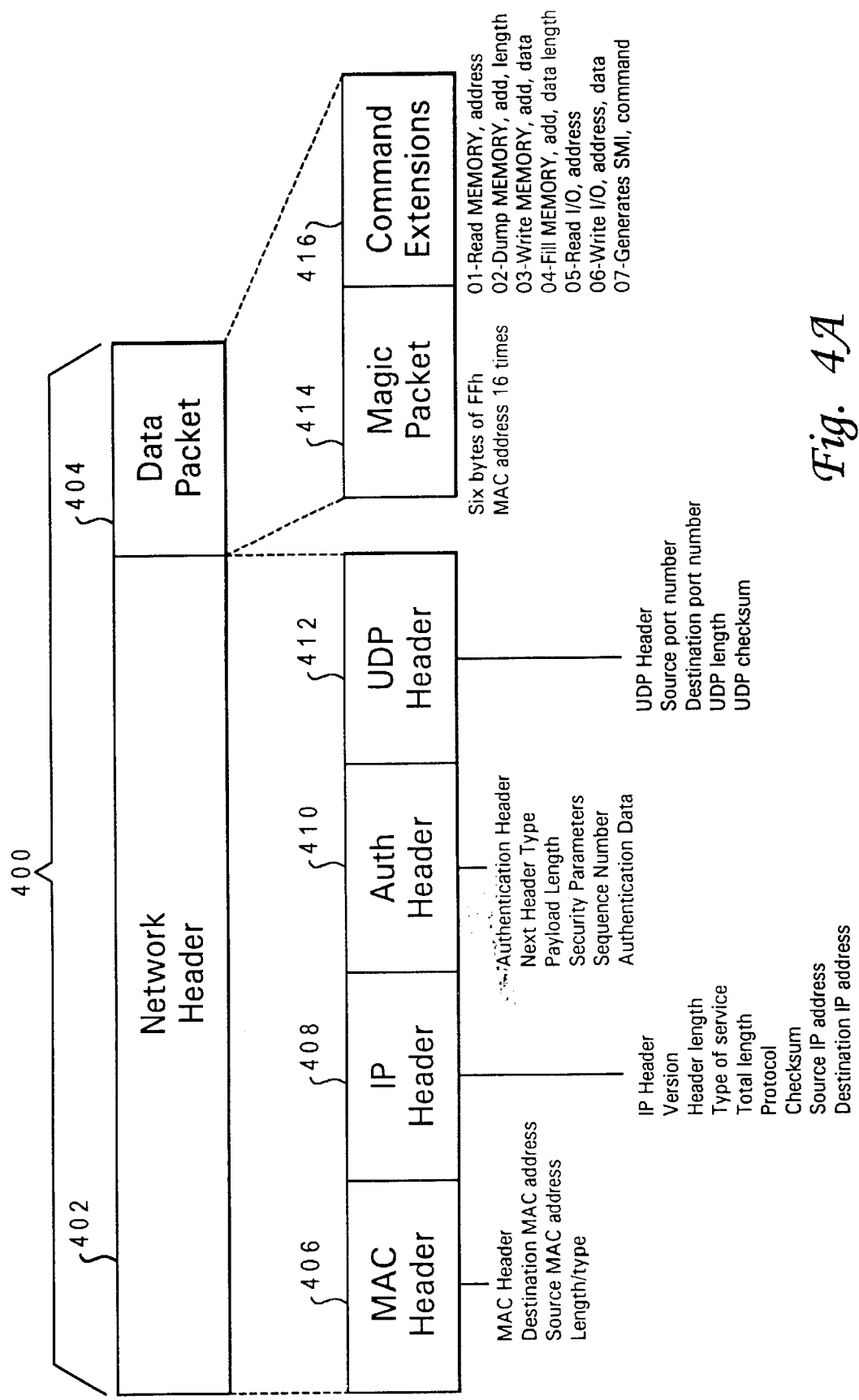
FIG. 4A illustrates a pictorial representation of a network packet, including a network header and a data packet, which may be transmitted by a server computer system over the network in accordance with the method and system of the present invention.

FIG. 4A illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also may include command extensions 416. Server computer system 100 may specify one of a plurality of command extensions in data packet 404 in order to remotely perform diagnostics on client 104. For example, the diagnostic command extension may be a command to read memory, write memory, dump memory, fill memory, read I/O, write I/O, and/or generate an SMI.

When a network packet 400 is received by client 104, it is received by physical layer 234 and placed on the MII bus 252. When network packet 400 includes magic packet 414, MAC 232 detects that it includes magic packet 414, and then MAC 232 ignores the network packet 400, including magic packet 414 and any command extensions 416. When magic packet 414 is included, ASIC 300 processes network packet 400, including any command extensions 416.

ASIC 300 also receives network packet 400 utilizing the MII interface 252. Data packet 404 is transferred to RX FIFO 310 and then to RX buffer 318. Micro-controller 302 then inspects data packet 404 and determines whether data packet 404 includes command extensions 416. If command extensions 416 are included, the appropriate function is executed in accordance with the description which follows.

Figure 4B:
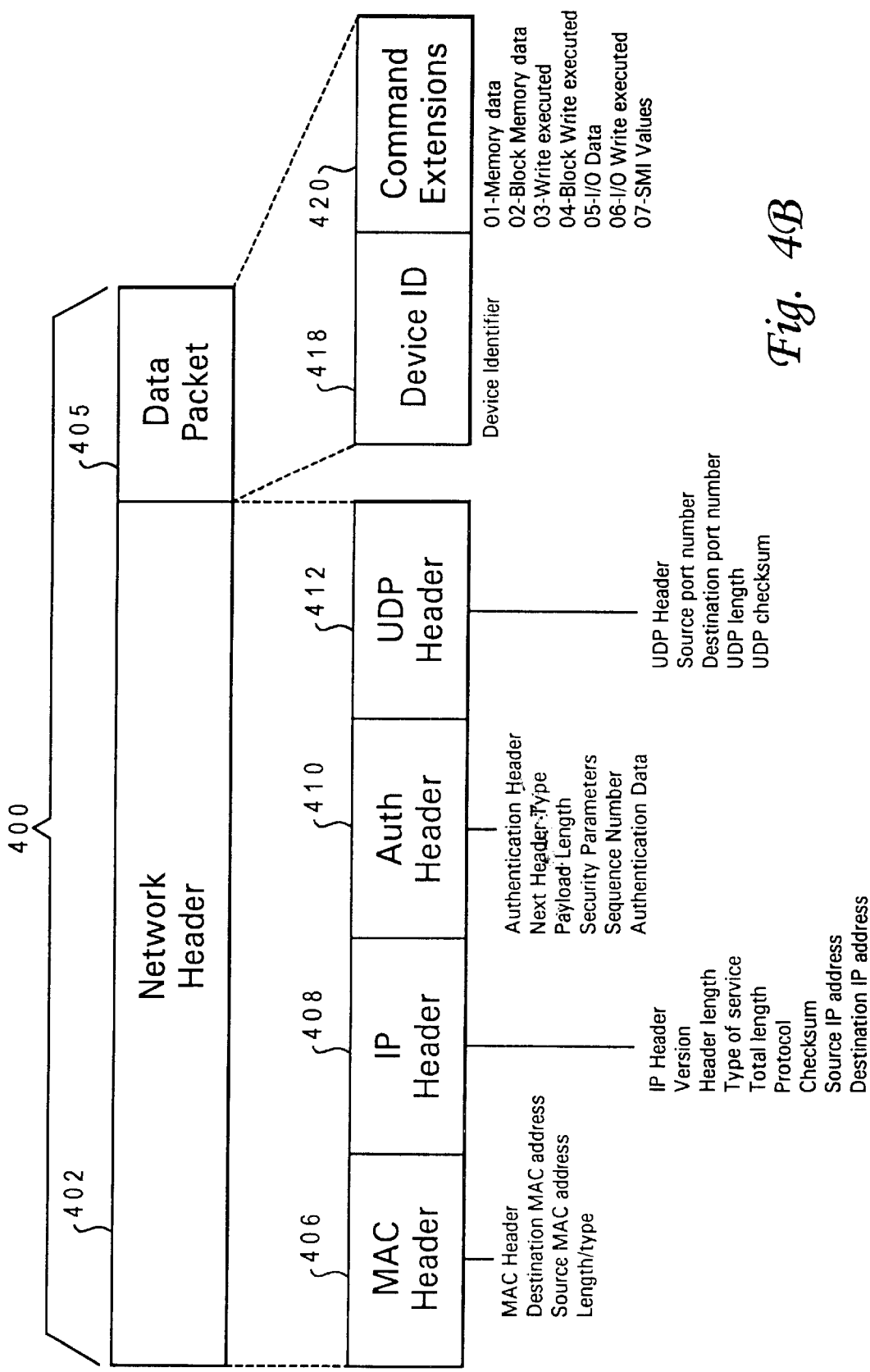
FIG. 4B illustrates a pictorial representation of a network packet, including a network header and a data packet, which may be transmitted by a client computer system over the network in accordance with the method and system of the present invention.

FIG. 4B illustrates a pictorial representation of a network packet 400, including a network header 402 and a data packet 405, which may be transmitted by a client computer system over the network in accordance with the method and system of the present invention. Each network packet 400 includes a network header 402 and a data packet 405.

Data packet 405 includes a device identifier packet 418 and command extensions 420. The device identifier packet includes an identification of the particular client computer system which transmitted this network packet.

Data packet 405 also may include command extensions 420. Client computer system 104 may specify one of a plurality of command extensions in data packet 405 responsive to a diagnostic command client 104 received from server 100. For example, command extensions may include data read from memory, a write memory executed command, data resulting from a dump memory command, a block memory write executed command, data read from I/O, a write data to I/O executed command, and/or values obtained from the generation of an SMI.

Those skilled in the art will recognize that the packet format illustrated in FIGS. 4A and 4B is one method for implementing the invention. However, other suitable packet formats exist which may be utilized to implement the same functionality described in these figures.

FIGS. 5A and 5B together depict a high level flow chart which illustrates a client computer system receiving a diagnostic command from a server computer system in accordance with the method and system of the present invention. The process starts as depicted by block 500 and thereafter passes to block 502 which illustrates a micro-controller 302 included within a client computer system waiting to receive network packet 400. When the packet has been received, physical layer 234 places data packet 404 included within network packet 400 on the MII bus 252. The MII bus 252 is read by MII interface 312 of ASIC 300. ASIC 300 transfers data packet 404 from MII interface 312 to RX FIFO 310 and to RX buffer 318.

The process then passes to block 504 which depicts micro-controller 302 removing network header 402 from the packet. Next, block 506 illustrates a determination by micro-controller 302 of whether data packet 404 included magic packet 414. If a determination is made that data packet 404 did not include magic packet 414, the process passes to block 512 which depicts the data included within data packet 404 being sent to the operating system (OS). The process then passes back to block 502.

Referring again to block 506, if a determination is made that data packet 404 did include magic packet 414, the process passes to block 508 which illustrates a determination of whether or not data packet 404 also included additional commands 416. If a determination is made that data packet 404 does not include any additional commands 416, the process passes to block 510 which depicts the transmission of a wakeup command which will cause the client to power up. The process then passes back to block 502.

Referring again to block 508, if a determination is made that data packet 404 does include additional commands 416, the process passes to block 512 which depicts the decoding of the additional commands 416. Next, block 514 illustrates a determination of whether or not the command specifies a read memory command. If a determination is made that the command specifies a read memory command, the process passes to block 516 which depicts adapter 230 reading the memory location, packetizing the data obtained from the memory location, and transmitting the packet to server computer system 100 in a packet as described by FIG. 4B. The process then passes back to block 502.

Referring again to block 514, if a determination is made that the command does not specify a read memory command, the process passes to block 518 which depicts a determination of whether or not the command specifies a memory dump command. If a determination is made that the command does specify a memory dump command, the process passes to block 520 which illustrates the adapter 230 reading the specified block of memory, packetizing the data obtained, and transmitting it to server computer system 100 in a packet as described by FIG. 4B. The process then passes back to block 502.

Referring again to block 518, if a determination is made that the command does not specify a dump memory command, the process passes to block 522 which depicts a determination of whether or not the command specifies a memory write command. If a determination is made that the command does specify a memory write command, the process passes to block 524 which illustrates adapter 230 writing the specified data to the specified address. The process then passes back to block 502.

Referring again to block 522, if a determination is made that the command does not specify a write memory command, the process passes to block 526 which depicts a determination of whether or not the command specifies a memory fill command. If a determination is made that the command does specify a memory fill command, the process passes to block 528 which illustrates adapter 230 writing the specified data to the specified addresses. The process then passes back to block 502.

Referring again to block 526, if a determination is made that the command does not specify a memory fill command, the process passes to block 530 which depicts a determination of whether or not the command specifies a read I/O command. If a determination is made that the command does specify a read I/O command, the process passes to block 532 which illustrates the adapter 230 reading the specified memory in the ISA space, packetizing the data obtained, and transmitting it to server computer system 100 as a packet as described by FIG. 4B. The process then passes back to block 502.

Referring again to block 530, if a determination is made that the command does not specify a read I/O command, the process passes to block 534 which depicts a determination of whether or not the command specifies a write I/O command. If a determination is made that the command does specify a write I/O command, the process passes to block 536 which illustrates adapter 230 writing the specified data to the specified address in the ISA space. The process then passes back to block 502.

Referring again to block 534, if a determination is made that the command does not specify a write I/O command, the process passes to block 538 which depicts a determination of whether or not the command is a generate SMI command. If a determination is made that the command is not a generate SMI command, the process passes back to block 502. Referring again to block 538, if a determination is made that the command is a generate SMI command, the process passes to block 540 which illustrates CPU 200 reading registers/status 304, servicing the SMI, writing the requested data to registers/status 304 via SM bus 238, and ASIC packetizing and transmitting a packet to server 100 including the obtained values.

While a preferred embodiment has been particularly shown and described, it will be understood by those skilled in the art that various changes in form and detail may be made therein without departing from the spirit and scope of the present invention.

What is claimed is:

1. A method in a data processing system for permitting a server computer to perform remote diagnostics on a malfunctioning client computer system, said client computer system being coupled to a server computer system utilizing a network, said method comprising the steps of:

said server computer system transmitting a diagnostic command to said malfunctioning client computer system utilizing said network;

a network adapter executing said diagnostic command, said network adapter operating as a bus controller for an internal bus within said malfunctioning client computer system; and said network adapter transmitting a result of said execution of said diagnostic command to said server computer system, wherein said diagnostic command is executed within a malfunctioning client computer system by a remote, server computer system.

2. The method according to claim 1, further comprising the step of in response to a receipt of said diagnostic command, said network adapter generating one of a plurality of bus events utilizing said internal bus to execute said diagnostic command.

3. The method according to claim 2, further comprising the steps of:

said server computer system transmitting a diagnostic memory read command to said malfunctioning client computer system to read one of a plurality of memory locations; and said network adapter reading said one of said plurality of memory locations.

4. The method according to claim 3, further comprising the steps of:

said server computer system transmitting a diagnostic memory write command to said malfunctioning client computer system to write data to one of said plurality of memory locations; and said network adapter writing said data to said one of said plurality of memory locations.

5. The method according to claim 4, further comprising the steps of:

said server computer system transmitting a diagnostic input/output read command to said malfunctioning client computer system to read one of a plurality of input/output locations; and said network adapter reading said one of said plurality of input/output locations.

6. The method according to claim 5, further comprising the steps of:

said server computer system transmitting a diagnostic input/output write command to said malfunctioning client computer system to write data to one of said plurality of input/output locations; and said network adapter writing said data to said one of said plurality of input/output locations.

7. The method according to claim 6, further comprising the steps of:

said client computer system including a central processing unit coupled to a memory controller;

said memory controller including a plurality of memory status registers;

said server computer system transmitting a diagnostic read memory status register command to said malfunctioning client computer system to read one of said plurality of memory status registers; and said network adapter reading said one of said plurality of memory status registers.

8. The method according to claim 6, further comprising the step of said network adapter generating a system management interrupt in response to a receipt of said diagnostic command, said system management interrupt causing said central processing unit to change its execution to service said system management interrupt.

9. The method according to claim 8, further comprising the steps of:

said server computer system transmitting said diagnostic command to a non-functioning client computer system utilizing said network; and said network adapter executing said diagnostic command.

10. A data processing system for permitting a server computer to perform remote diagnostics on a malfunctioning client computer system, said client computer system being coupled to a server computer system utilizing a network, comprising:

said server computer system executing code for transmitting a diagnostic command to said malfunctioning client computer system utilizing said network;

a network adapter executing code for executing said diagnostic command, said network adapter operating as a bus controller for an internal bus within said malfunctioning client computer system; and said network adapter executing code for transmitting a result of said execution of said diagnostic command to said server computer system, wherein said diagnostic command is executed within a malfunctioning client computer system by a remote, server computer system.

11. The system according to claim 10, further comprising in response to a receipt of said diagnostic command, said network adapter executing code for generating one of a plurality of bus events utilizing said internal bus to execute said diagnostic command.

12. The system according to claim 11, further comprising:

said server computer system executing code for transmitting a diagnostic memory read command to said malfunctioning client computer system to read one of a plurality of memory locations; and said network adapter executing code for reading said one of said plurality of memory locations.

13. The system according to claim 12, further comprising:

said server computer system executing code for transmitting a diagnostic memory write command to said malfunctioning client computer system to write data to one of said plurality of memory locations; and said network adapter executing code for writing said data to said one of said plurality of memory locations.

14. The system according to claim 13, further comprising:

said server computer system executing code for transmitting a diagnostic input/output read command to said malfunctioning client computer system to read one of a plurality of input/output locations; and said network adapter executing code for reading said one of said plurality of input/output locations.

15. The system according to claim 14, further comprising:

said server computer system executing code for transmitting a diagnostic input/output write command to said malfunctioning client computer system to write data to one of said plurality of input/output locations; and said network adapter executing code for writing said data to said one of said plurality of input/output locations.

16. The system according to claim 15, further comprising:

said client computer system including a central processing unit coupled to a memory controller;

said memory controller including a plurality of memory status registers;

said server computer system executing code for transmitting a diagnostic read memory status register command to said malfunctioning client computer system to read one of said plurality of memory status registers; and said network adapter executing code for reading said one of said plurality of memory status registers.

17. The system according to claim 16, further comprising said network adapter executing code for generating a system management interrupt in response to a receipt of said diagnostic command, said system management interrupt causing said central processing unit to change its execution to service said system management interrupt.

18. The system according to claim 17, further comprising:

said server computer system executing code for transmitting said diagnostic command to a non-functioning client computer system utilizing said network; and said network adapter executing code for executing said diagnostic command.

19. A data processing system for permitting a server computer to perform remote diagnostics on a malfunctioning client computer system, said client computer system being coupled to a server computer system utilizing a network, comprising:

said client computer system including a central processing unit coupled to a memory controller;

said memory controller including a plurality of memory status registers;

said server computer system executing code for transmitting a diagnostic read memory status register command to said malfunctioning client computer system utilizing said network to read one of said plurality of memory status registers;

a network adapter executing code for generating one of a plurality of bus events utilizing said internal bus to read said one of said plurality of memory status registers, said network adapter operating as a bus controller for an internal bus within said malfunctioning client computer system; and said network adapter executing code for transmitting a result of said execution of said diagnostic read memory status register command to said server computer system, wherein said diagnostic command is executed within a malfunctioning client computer system by a remote, server computer system.

* * * * *